United States Patent [19]

Sundberg

[11] 4,252,871
[45] Feb. 24, 1981

[54] TUBULAR SUPPORT SLEEVE FOR LEAD-ACID STORAGE BATTERY

[75] Inventor: Erik Sundberg, Newtown Crossings, Pa.

[73] Assignee: Koehler Manufacturing Company, Marlborough, Mass.

[21] Appl. No.: 49,594

[22] Filed: Jun. 18, 1979

[51] Int. Cl.³ .............................................. H01M 4/76
[52] U.S. Cl. .................................. 429/140; 429/141; 429/254
[58] Field of Search ............... 429/140, 141, 136, 131, 429/142, 238, 254

[56] References Cited

U.S. PATENT DOCUMENTS

| | | | |
|---|---|---|---|
| 2,747,007 | 5/1956 | Brandt | 429/141 |
| 2,896,006 | 7/1959 | Sundberg | 429/140 |
| 3,224,905 | 12/1965 | Hentschel | 429/141 |
| 3,266,935 | 8/1966 | Boriolo | 429/136 X |
| 3,287,248 | 11/1966 | Braithwaite | 429/140 X |
| 3,503,807 | 3/1970 | Sundberg | 429/141 |
| 3,619,319 | 11/1971 | Utz | 156/229 |
| 3,972,728 | 8/1976 | Sundberg et al. | 429/141 |
| 4,048,399 | 9/1977 | Terzaghi | 429/141 |
| 4,140,839 | 2/1979 | Hoffman et al. | 429/140 |
| 4,144,115 | 3/1979 | Sundberg | 429/140 X |

FOREIGN PATENT DOCUMENTS 1240826  8/1960  France ..................................... 429/140

*Primary Examiner*—Anthony Skapars
*Attorney, Agent, or Firm*—Hamilton, Brook, Smith & Reynolds

[57] ABSTRACT

A tubular support sleeve for tubular storage battery plates comprises a seamless helical tubular lattice structure of fusible flat reinforced thermoplastic tapes, the tapes being fused to one another at their points of intersection. The tapes may be in the form of a laminate consisting of a central strength member having a fusible material on either side thereof. The support sleeve may be used alone or it may be used to contain a braided or felted retaining sleeve. Fusible flat reinforced thermoplastic tapes and staple fiber strands may be braided or woven together to produce a sleeve having combined support and retaining capabilities.

34 Claims, 8 Drawing Figures

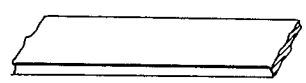
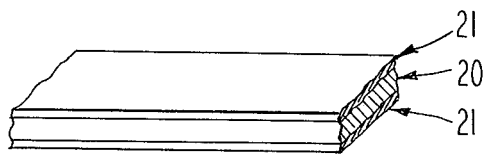
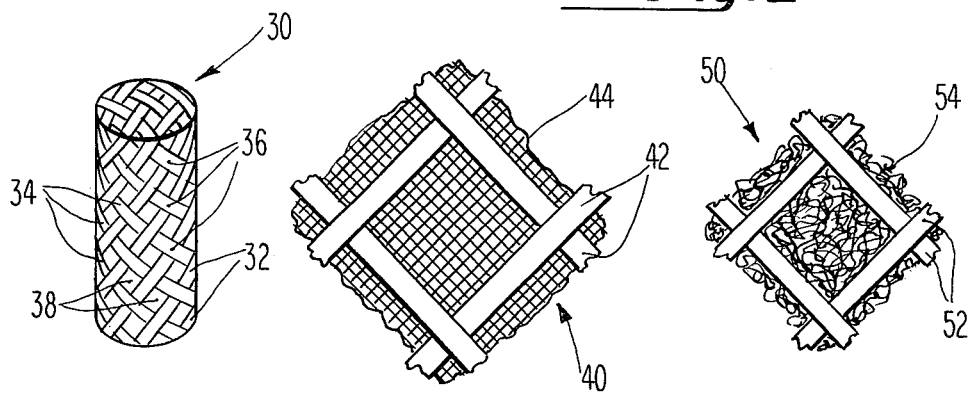
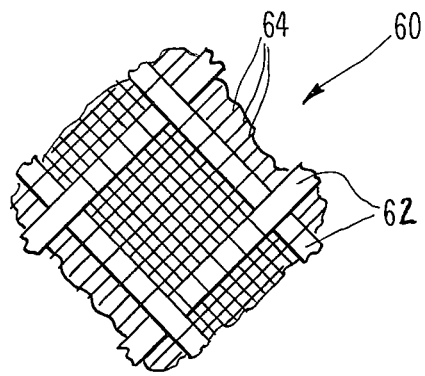
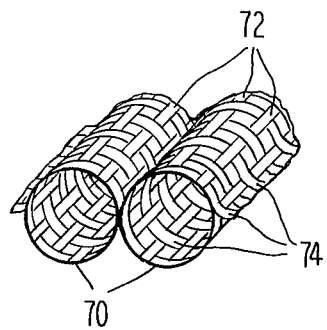
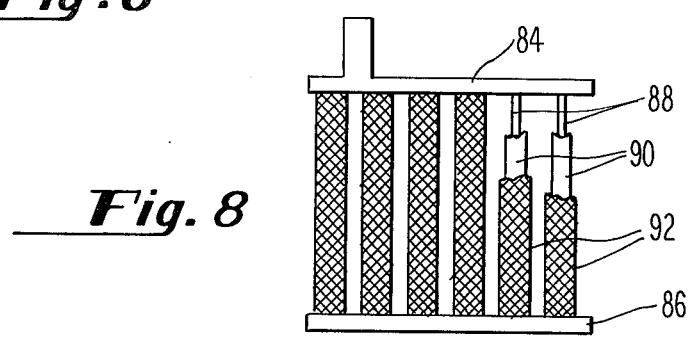

TUBULAR SUPPORT SLEEVE FOR LEAD-ACID STORAGE BATTERY

DETAILED DESCRIPTION OF THE PRIOR ART

The present invention relates generally to lead-acid storage battery cells. More particularly, it relates to a tubular retainer for use with electrodes of the tubular type of construction.

The tubular type of electrode uses a grid composed of a number of parallel vertical current collecting spines of lead alloy cast integrally with a current collecting top bar. Surrounding and in electrical contact with the spines is a cylinder of active material. In positive plates, the active material (generally $PbO_2$), is contained within a porous support sleeve, the support sleeve being made of non-conductive maerial impervious to the cell electrolyte (sulfuric acid) and the oxidizing environment found on the surface of a positive plate.

This storage battery construction has been known and used for more than 50 years and has given outstanding performance under the most severe operating conditions.

During the life of a storage battery the positive active material tends to expand and push outward with a considerable pressure. Principal purposes of the support sleeve are to combat this pressure and to retain the active material in contact with the central current collecting spines. It is also necessary that the battery electrolyte have access to the active material. Thus the design of a support sleeve is a compromise between a complete enclosure for maximum strength and an open structure for maximum electrolyte passage.

This history of support sleeve development has been fully recorded in U.S. patents. Various styles of improved tubes are in widespread use today. In one, an inner retaining sleeve of braided staple glass thread is used to retain the positive active material and provide electrolyte passage by a wicking action peculiar to untreated glass fibers. The glass tube is surrounded and supported by an outer support sleeve made from a perforated plastic sheet. For practical purposes the outer sleeve has been made from polyvinyl chloride sheet. The perforated sheet is rolled into a tube and closed with a lap seam.

In another style of tube a similar tubular braid of staple glass threads alone supports the active material. In this style the braided tube is made dimensionally stable by impregnating it with a resistant cement. The cement which has been found to be best is a phenolic resin.

In both of the above tube styles, use is made of a fabric braided on a circular or tube braiding machine. There are other styles of support tubes using fabrics woven on a more normal type of loom having warp and weft strands.

In the tubular braiding machine there are two groups of yarn spindles, each arranged to follow tracks which produce both a circular and a radial transverse. One group of spindles travels in the right-hand direction and the other in the left-hand direction, with the spindles following their respective intersecting paths. Yarn is drawn from each spindle into a common forming ring from which a seamless braided fabric tube emerges. The strands of the weave follow helical paths around the axis of the tube. There is no difference in the left hand and the right hand spiralling strands. A good example of such a hollow braided material is the ordinary shoelace.

Braided tubular fabrics of this sort are well known and are produced in tremendous quantity throughout the world.

Variables in the braiding machine operation by which the porosity of the resulting tube may be controlled include the number of spindles, the ratio of yarn feed to the number of cross-overs of the sets of spindles per unit of yarn feed (called the number of "picks" per inch), and the size of the yarn used.

In fabrics woven on a conventional loom variables include the size of the strands, the number of weft strands per unit of width and the number of warp strands per unit of length of the tube.

It is a feature of a braided material having no longitudinal members that, once braided, its diameter is determined by its length. The same piece of tube may be short and of relatively large diameter or it may be pulled out to be long and of smaller diameter.

If an untreated tube having no longitudinal members is used as a support sleeve in a tubular storage battery plate, the tube will become shorter and larger in diameter due to the aforementioned expansion of the active material. The shrinkage in length may leave a portion of the original cylinder of active material unsupported. In service, this portion becomes inactive resulting in loss of capacity of the storage cell and premature cell failure.

In the first style of support tube described above the tube dimensions are fixed by the external sheath of perforated plastic. In use, the swelling of the positive material forces the braided fabric to move a slight distance into the perforations of the plastic tube and firmly lock the fabric tube to the plastic tube. It has been found that the polyvinyl chloride of the plastic support can be subject to chemical attack, causing a very harmful release of chlorine into the cell.

There are definite limitations as to the porosity which can be obtained by perforating a plastic sheet, and the cost of perforating dies is relatively great and may hamper design flexibility. The overlapping joint of the sleeve (i.e. the seam) takes up space and often the perforations at the joint do not coincide, thereby reducing the total tube porosity.

The second style of tube avoids some of these difficulties. In it, the braided tube is stabilized by impregnating the braided tube with a cement which locks each intersection of the braid so that the tube will not change its dimensions. Unfortunately, the natural porosity of the staple yarn is lost during impregnation and the porosity of the tube will therefore be limited to the openings between the several strands of yarn forming the tube. Further, the most successful cement for impregnation has been found to be a phenolic resin which slowly oxidizes and disappears, leaving the tube without diametrical strength and with faults as described above. To alleviate some of these problems, tubes have been described where some of the yarns are thermoplastic. After braiding, the tube is heated and formed causing the thermoplastic yarns to fuse together at intersections and thus provide dimensional stability.

In another design the tube is formed with longitudinal yarns braided into the fabric which control the tube length. In this case the yarns are braided around a mandrel having a diameter equal to the desired inner diameter of the tube.

SUMMARY OF THE INVENTION

The present invention describes the use of fusible flat reinforced thermoplastic tapes, which may be of monofilament construction, to provide the strength members of tubular support sleeves for use in storage battery plates.

Monofilaments are distinguishable from multi-thread or staple yarns in the fact that the former, when cut across, show a single member, whereas the latter, when similarly cut, show many small fibers making up the complete yarn. For example, the staple fiber strands as used in the storage battery art often comprises three threads, each thread comprising some 20 to 50 individual monofilaments. Staple fibers may be, for example, glass or plastic.

In a first embodiment of the invention, a seamless tube is braided on a tubular braiding machine using fusible flat reinforced thermoplastic tapes. After braiding, the tube is stabilized by heating and pressing such that the tapes are fused to one another at their points of intersection to present a seamless helical tubular lattice structure. Such a tube will have the strength and dimensional stability needed for storage battery use. Quadrilateral openings between the strands provide a controlled porosity to the support sleeve.

In a second embodiment, a braided tube of staple fiber yarns is fed through a second braiding operation where fusible flat reinforced thermoplastic tapes are braided to form a seamless tube around the fiber tube. The double tube is then heated and pressed so that fusion occurs at the points of intersection of the tapes with one another. At the points of intersection between the tapes and the staple fibers the fibers may be at least partially embedded and locked into the surfaces of the tapes. This combined effect permanently fixes the dimensions of the support sleeve.

A further embodiment of this design includes a tube of non-woven fiber mat around which the tapes are braided and then fused as described above. The porosity of the sleeve of the latter two embodiments is defined by the openings in both the inner and outer tubes.

In a fourth and preferred embodiment of the invention, both fusible, flat reinforced thermoplastic tapes and staple fiber strands are braided together on a single braiding machine to form a composite fusible tape-staple fiber sleeve. After braiding, the sleeve is stabilized by heat and pressure to fix its dimensions. This construction differs from the construction described in the second embodiment above in that in the second embodiment there is a complete braided staple fiber fabric underlying an outer sleeve made from fusible flat reinforced thermoplastic tapes. In the fourth embodiment this need not be so: the braider has an option of placing or not placing fibers under the tapes. Since the staple glass fibers are relatively costly, there may be a cost saving by their omission. On the other hand, staple fibers, and especially glass fibers, have a remarkable ability to transfer battery electrolyte by capillary action. In some cases the improvement in battery performance due to the additional electrolyte transport when glass fibers underly the tapes can more than offset the cost of the additional glass fibers.

After braiding, the sleeve is stabilized by the application of heat and pressure so as to fuse the tapes to one another at their points of intersection, and may also provide partial fusion embedding of staple fibers in the surfaces of the thermoplastic tapes at the points where the fibers and tapes intersect. With this construction, the porosity is defined by the openings between the tapes, the openings between the staple fiber strands, and the porosity of the staple fiber strands themselves.

In another preferred embodiment (in other respects like any of the embodiments described above), the flat tapes as described are formed from a laminate in which a thermosetting central core of a strong material is combined with outer layers a less strong thermoplastic. A preferred laminate comprises a central layer of a strong thermosetting resin such as polyester resin with a layer of polyolefin resin (a thermoplastic) on either side of the polyester. The polyester is a very strong material, especially when its molecules are oriented in the direction of stress. Unfortunately, polyester resins tend to hydrolyze in electrolyte, and lose some of their strength. Polyolefins, on the other hand, are substantially inert in an acid environment. Therefore, the coating of polyolefin serves two purposes: (1) it protects the polyester, and (2) it provides a fusible surface. By methods known to the art, polyester can be given the desired longitudinal orientation of its molecules during manufacture. The tapes may be formed directly by extrusion. A preferred preparation consists of a wide sheet of material which may be coated to produce a laminate, and otherwise treated to provide desirable properties. It may then be cut into ribbons of a desired width using slitting equipment well known in the art. Another preferred preparation consists of a fusible thermoplastic material, reinforced with glass or other fibrous material, in which the fibers are oriented longitudinally to the slit tape. It is pointed out that both the polyester and the glass fiber reinforcement described have a higher softening temperature than the polyolefin.

The several embodiments of the invention noted above make use of a support sleeve formed on a tubular braiding machine. Desirable support sleeves may also be fabricated on weaving looms having warp threads (longitudinal to the direction of weaving) and weft threads (transverse to the direction of weaving). The loom is set up to weave a double-layer fabric similar to a cartridge belt, which produces a plurality of connected tubes called "multi-tubes". The loom woven fabric differs from the braided tubes in that some of the tapes are positioned parallel to the length of the support sleeve and the remainder at right angles to the length. The tubes so formed have natural longitudinal strength and natural circumferential strength. However, tapes at the ends of the sleeves are readily removable, and it is desirable, as with braided tubes, to stabilize the weave by heating and pressing to fuse the several tapes to one another at their points of intersection. Openings between warp and weft tapes provide a controlled porosity to the woven sleeve.

With loom weaving it is also possible to weave fabrics having both fusible flat reinforced thermoplastic tapes and staple thread strands in warp and weft. Using this technique, a support sleeve having properties similar to the sleeve of the fourth embodiment may be fabricated.

Support sleeves similar to those of the second embodiment may be prepared using loom woven outer support sleeves. In this instance, the inner retaining sleeves may be placed in the weave either during the weaving operation or after the outer multi-tube weave has been completed. Following insertion, the inner and outer tubes are stabilized and fused to one another by heat and pressure.

Although there are differences in the methods of manufacturing woven and braided tubes, there are instances when fabrics made by the two techniques cannot be distinguished. In the following discussion the term "woven" sleeve will be used to describe materials produced by either method unless otherwise noted.

For use in storage batteries, and particularly as an aid in manufacture, support sleeve should be self-supporting and should, in their final form, be ready for use. However, the tubes are often fabricated at some distance from the point of use so that the shipping costs of the formed tubes becomes high when compared to the costs of a compacted material of equal weight. The tube of the invention can be fabricated and then collapsed for shipping to the point of use. Upon receipt, the flat material can easily be converted to a desired tubular shape by heating, forming, and cutting to length. By this means, shipping costs can be kept to a minimum.

The advantages realized by the utilization of a tube of the invention in a storage battery may be summarized into four general classes: (1) savings in cost, (2) increased strength, (3) minimization of chemical contamination, and (4) flexibility of design.

Cost savings may be realized by the lower cost of a tape cut from a wide sheet when compared to the cost of staple fibers which may be replaced by the wider tape, the lower cost of a tube of the invention when compared to conventional tubes having a perforated PVC foil and which may require a cement, elimination of costly tooling for perforating the PVC foil, and a reduced shipping cost of collapsed tubes which may then be re-shaped at their point of use.

Increased strength may be obtained by the use of tapes having their molecules oriented longitudinally to the tape, the ability to fuse tapes to one another and to staple fibers, the ability to use a laminate having a central core of strong, non-fusible material or a fiber-reinforced thermoplastic material, and the elimination of perforation of a PVC foil which may disrupt the molecules of the polymer.

Chemical contamination may be minimized by the elimination of cements or phenolic resins to bond the fiber strands, and the elimination of the PVC foil which may, under some circumstances, release harmful chlorine into the battery environment.

Increased flexibility of design is provided by the ability to vary the porosity of the tube by changing the width of or number of flat reinforced thermoplastic tapes, and by the ability to shape tubes of the invention to virtually any desired configuration by the utilization of heat and pressure.

BRIEF DESCRIPTION OF THE DRAWINGS

FIG. 1 depicts a flat tape.

FIG. 2 depicts a laminated flat reinforced thermoplastic tape.

FIG. 3 depicts a first embodiment of the support sleeve of the invention.

FIG. 4 depicts a small portion of a second embodiment of the support sleeve of the invention.

FIG. 5 depicts a small portion of a third embodiment of the support sleeve of the invention.

FIG. 6 depicts a small portion of a fourth embodiment of the support sleeve of the invention.

FIG. 7 depicts a small portion of a support sleeve of the invention as woven on a cartridge type loom.

FIG. 8 depicts a tubular plate for a lead-acid storage battery utilizing a tube of the invention.

DETAILED DESCRIPTION OF THE INVENTION

FIG. 1 illustrates a portion of a flat thermoplastic tape. Such a strand may be formed by direct extrusion, or it may also be prepared at a very low cost by splitting individual tapes from a wide sheet of the desired material. For use in the present invention, the tape must be strong, be resistant to the chemical environment of a lead-acid storage battery, and be capable of fusion to itself. Two suitable materials are polyethylene and polypropylene; other thermoplastic materials may also be suitable. The manufacture of such tapes may inherently orient the molecules of the material in a longitudinal direction, providing increased tensile strength when contrasted to a perforated sheet.

FIG. 2 shows a second form of fusible flat reinforced thermoplastic tape which, in this case, is in the form of a laminate having a central strength layer 20, which may be difficult to fuse, and outer layers as 21 of an easily fused material firmly attached to 20. An example of a suitable laminate may be a central sheet of polyester with outer layers of a polyolefin such as polyethylene or polypropylene. Polyester sheet, having its molecules oriented in the longitudinal direction, is particularly suitable for the central layer 20 as this material is very strong in the longitudinal direction.

The dimensions of the flat monofilament strand will depend upon the exact braid and sleeve porosity desired. For practical purposes the width will commonly be between 0.3 and 5.0 mm and the thickness between 0.025 and 0.4 mm. The width in every case should be at least twice the thickness for ease of handling.

The preparation of sheet material, polyolefin or laminated polyester, is well known to the art and need not be described. These materials are used in great quantity in the packaging industry, where strength and fusibility may be required. The sheet materials are obtainable in rolls up to 2 meters or more in width and hundreds of meters in length. The sheet may be cut to a desired width by use of a slitting rolls, a device widely used in many industries, e.g. for producing recording tape.

In FIG. 3 a portion of an open braid cylindrical support sleeve 30 made from monofilament strand as described above is shown. There are two sets of tapes in this braid: a first set 32, spiralling along the length of the tube in a right-hand direction, and a second set 34, spiralling along the length of the tube in a left-hand direction. The two sets of tapes cross at points as shown at 36. It is a principal part of this invention that at each crossing or intersection, as 36, of the tapes 32 and 34, the tapes are fused to one another. The fusion is accomplished by heating and pressing the support sleeve during or after the braiding operation, and produces a seamless helical tubular lattice structure. The fusing of polyolefin materials by the use of heat and pressure is well known in the packaging and other industries.

It will be noted that the tube 30 is characterized by having quadrilateral openings as 38. These openings may be diamond shaped or square. However, if the number of right-hand tapes 32 is greater than the number of left-hand tapes 34, the openings become parallelograms or rectangles. The size and shape of the support sleeve and the openings 38 are determined both by the width and number of tapes 32 and 34, the speed of the take-off of material from the braiding machine, i.e. the number of "picks" per unit length, and by the size and shape of the mandrel used in the fusing operation. The size of the openings is such as to give a porosity to the tube of 15 to 85 percent of the total tube surface. Thus to obtain a finished sleeve of a desired configuration, the tape material must be properly selected and sized, be properly braided and finally fused together so as to maintain the desired shape.

The amount of opening of a support sleeve, often called the porosity or the percent porosity, can be varied by proper choice of tape sizes and braiding or weaving parameters as discussed above.

The desirable porosity depends upon the use for which the storage battery is designed. For example, a battery used in high discharge rate applications will require maximum porosity tubes such as 50 to 85 percent, whereas a battery for low rate use can use a much lower porosity such as 25 to 50 percent. The additional strength of the low porosity tube will be desirable in this service because the active material in low rate discharges will swell with greater pressure than in the high discharge cell. In certain applications, in particular miner's cap lamp batteries, a low maximum short-circuit current is desirable for safety reasons. This desirable condition can be obtained by using a battery of high internal resistance. This in turn is obtained by using a support sleeve having the lowest porosity, i.e. in the range of 15 to 25 percent.

The width of the individual tapes should be sufficient to minimize transverse flexure of the fused tapes, thereby minimizing distortion of the sleeve.

FIG. 4 illustrates another embodiment of the invention and depicts a small portion of a support sleeve 40. In this embodiment a strength tube 42 comprising a seamless helical tubular lattice structure surrounds an inner retaining tube 44 of woven staple fibers, which has very small openings compared to the openings of the outer tube. The inner tube 44 may be braided on a tubular braiding machine in a manner similar to the braiding of the outer tube 42. The outer tube 42 is dimensionally stabilized by fusing the intersections of the strands as described above for FIG. 3. For operation in a battery it is not necessary that the inner tube 44 be attached to the outer tube 42. However, for ease of handling during manufacture, it is desirable that the two tubes be joined together. This can be accomplished by partially fusion embedding the fibers of the inner tube into the surfaces of the tapes of the outer tube simultaneously with the fusion of the intersections of the tapes of the outer tube, and with the same equipment.

When the inner tube and outer tube are fused together some of the fusible material may enter into pores of the staple fibers and thus close them off. This may have a somewhat adverse effect on the passage of acid through the inner staple fiber tube. As a corrective measure, the inner staple fiber tube may also be affixed to the outer support tube by the use of a cement; in particular, a soluble cement such as starch may be used. In use, the starch dissolves from the tube by the action of the electrolyte, and the inner tube wall will therefore become completely open for best transfer of electrolyte. In this case, the inner tube is prevented from shape changes by a swelling of the active material forcing the fibers of the inner tube slightly into the openings of the outer tube.

FIG. 5 shows a portion of a tube 50, quite similar to that of tube 40 of FIG. 4, with one difference. An open mesh outer strength tube of seamless helical tubular lattice construction, shown as 52, supports an inner staple fiber retaining tube 54 having very small openings. The inner tube 52 in this case comprises a porous non-woven fabric. Non-woven porous fabric for battery use is readily obtainable in large rolls. Tubes may be formed from this material by forming a strip of sheet around a mandrel and may include an overlap.

The principal advantage of the tube 50 (FIG. 5) over the tube 40 (FIG. 4) is that non-woven fabric as 54 is considerably less costly than braided fabric as 44 and is equally suitable as a retainer in a storage battery.

FIG. 6 depicts a further preferred embodiment of the invention. In this case the tubular braiding machine is provided with both staple fiber threads and fusible flat reinforced thermoplastic tapes, and the two kinds of strands are braided together. A support sleeve 60 comprises tapes 62 and multi-filament fiber threads 64 braided together to form a single fabric. In this method of manufacture, the fibrous material threads will be interlaced with the flat tapes and there may therefore be no need to cement or otherwise bond the fibrous material to the tapes or the tapes to one another as may be the case in FIGS. 4 and 5. However, should a greater degree of rigidity be desired, it has been found that polyolefin can be heated preferentially to other fibers, such as glass or polyester, by a suitable choice of heating parameters. After braiding, therefore, the tube may be stabilized by fusing the intersections of the fusible flat reinforced thermoplastic tapes. By this means it is possible to fuse the tapes together without closing pores in the staple fiber threads. Conversely and if so desired, the intersections of all fibers crossing the tapes can be fused by the use of less selective heating parameters.

FIG. 7 depicts a double walled multi-tube construction as woven on a loom set up in a "cartridge belt" mode. Portion of two tubes 70 are shown. Weft strands 72, comprising fusible flat reinforced thermoplastic tapes, run parallel to the length of the tubes, and warp members 74, also comprising fusible flat reinforced thermoplastic tapes, run at right angles to the length of the tube. After weaving, the fabric is stabilized by heat and pressure so that the tapes are fused to one another at their points of intersection. The porosity of the tubes is determined by the number of weft tapes per unit of length, the number of warp tapes per unit and the width of the tapes. The interwoven and fused tapes define opposing interwoven lattice structures presenting quadrilateral openings between the tapes.

In a variation of this construction, strands of staple fiber threads are set up in the loom between the fusible flat reinforced thermoplastic tapes. When these are woven, a structure resembling that of FIG. 6 results. This structure can be stabilized by the application of heat and pressure. The porosity is determined by the porosity of the lattice structures and the porosity of the staple fiber weave. This structure, like that of FIG. 6, requires no cement or other bonding between the staple fibers and the tapes.

In actual practice, glass fibers are commonly used in the construction of retainer tubes for storage batteries, due to their excellent acid diffusion properties. However, it has been found that polyester fibers may retain their tensile strength for a considerably longer time in the battery environment, even though the surface of such fibers may become hydrolyzed, thereby reducing the porosity of the individual fibers. By braiding or weaving with openings between such fibers sufficient porosity may be obtained, and, due to the lower cost of polyester fibers as opposed to glass, as well as to the improved tensile strength, use of such polyester fibers may be preferred for some applications. Use of surfactants in combination with the polyester fibers, or of other suitable fibrous material, may also present some advantages.

If glass fibers are employed, they may be suitably treated with a surface coating to improve the abrasion resistance of such fibers.

In any of the above embodiments, it may be desirable to include longitudinal strands of either staple fibers or of fusible flat reinforced thermoplastic tapes within the braid or weave, braiding or weaving the tube over a mandrel, in order to provide fixed dimensions for the tube. Obviously, in the case where longitudinal tapes are included, some of the openings in the lattice will not be quadrilateral, but will be triangular or polygonal in shape.

In certain types of batteries it may be desirable to mask off certain portions of the tube wall. This may be easily accomplished by the inclusion of additional flat thermoplastic tapes in the braid or weave, said additional tapes being oriented longitudinally to the tube and extending around a desired portion of the circumference, commonly less than 180°.

FIG. 8 depicts a cutaway view of a typical tubular type positive plate for storage battery use making use of the support sleeve of the invention. In FIG. 8 a top bar 84 and a bottom bar 86 define the top and bottom of the plate. Several vertical spines 88, cast integrally with the top bar, complete the grid structure. This part is cast from a lead alloy. Surrounding each vertical spine 88 are cylinders of positive active material 90. The active material is lead peroxide and is prepared from lower lead oxides by well known methods. The cylinders of positive material 90 are supported by the support sleeves of the invention 92.

To further illustrate the employment of the invention two examples are shown herewith:

EXAMPLE 1

A braided support sleeve is prepared having a center-to-center distance D between tapes of 4 mm. The tape width S is chosen to be 0.5 mm. A formula can be used to determine the precent porosity as follows. (The braids are at right angles.):

$$\% \text{ Porosity} = 100 \times \frac{D^2 - S(D + D - S)}{D^2}$$
$$= \frac{12.25}{16} \times 100$$
$$= 76.6\%$$

EXAMPLE 2

A woven support sleeve is prepared having a center-to-center distance W between weft and weft of 3 mm, a center-to-center distance L between warp and warp of 2 mm and a tape width of 0.6 mm. The percent porosity can be found by the formula:

$$\% \text{ Porosity} = 100 \times \frac{W \times L - S(W + L - S)}{W \times L}$$
$$= 100 \times \frac{6 - 2.64}{6}$$
$$= 56\%$$

Having now described my invention and shown methods of its manufacture and use, I now claim the following as my invention:

1. In a tubular support sleeve for use in tubular lead-acid storage battery plates the improvement which comprises: a support tube braided from fusible flat reinforced thermoplastic tapes, said tapes being fused to one another at their points of intersection to define a seamless helical tubular lattice structure having quadrilateral openings between the fused tapes which provide a predetermined and controlled porosity for the support tube.

2. The sleeve of claim 1 wherein the thermoplastic material of the tapes is a polyolefin.

3. The sleeve of claim 1 wherein the thermoplastic tapes consist of a polyolefin and the polyolefin is reinforced by the inclusion of stronger fibrous materials having a higher softening temperature than that of the polyolefin, the fibers being oriented along the length of the tape.

4. The sleeve of claim 1 wherein the fusible flat reinforced plastic tapes are a laminated material having outer layers of a fuisible thermoplastic material and having a central strength member of a stronger material having a softening temperature higher than that of the outer layers.

5. The sleeve of claim 4 wherein the central strength member is polyester resin and the outer layers are a polyolefin, the molecules of the polyester being oriented along the length of the tape.

6. The sleeve of claim 1 wherein the porosity of the support tube is within the range of 15% and 85%.

7. The sleeve of claim 1 wherein the porosity of the support tube is within the range of 85% and 50%.

8. The sleeve of claim 1 wherein the porosity of the support tube is within the range of 25% and 50%.

9. The sleeve of claim 1 wherein the porosity of the support tube is within the range of 15% and 25%.

10. In a tubular support sleeve for use in a tubular storage battery plate the improvement which comprises: an outer strength tube having large quadrilateral openings therethrough and an inner retaining tube defining small openings therethrough compared to the openings of the outer tube, the outer tube comprising a support tube braided from fusible flat reinforced thermoplastic tapes, said tapes being fused to one another at their points of intersection to define a seamless helical tubular lattice structure, the sleeve having a predetermined and controlled porosity defined by the openings in both the outer and inner tubes.

11. The support sleeve of claim 10 wherein the inner retaining tube comprises a porous tube woven from staple fiber strands.

12. The support sleeve of claim 10 wherein the inner retaining tube comprises a porous tube formed from a non-woven fabric.

13. In a tubular support sleeve for use in lead-acid storage battery plates the improvement which comprises: a composite support and retaining tube braided from both fusible flat reinforced thermoplastic tapes and staple fiber strands, the tapes being fused to one another at their points of intersection to define a seamless helical tubular lattice structure presenting quadrilateral openings therethrough which are of a predetermined and controlled dimension, the staple fiber strands being interbraided with the tapes and lying between and substantially parallel to some of the tapes of the lattice structure, the porosity of the sleeve being defined by the quadrilateral openings between the tapes, the openings between the staple fiber strands, and the porosity of the staple fiber strands themselves.

14. A sleeve according to claim 13 wherein certain of the fibers are at least partially fusion embedded in surfaces of the types at the points of intersection between the fibers and tapes.

15. A sleeve according to any one of claims 10 through 14 wherein the staple fibers are glass.

16. A sleeve according to any one of claims 10 through 14 wherein the staple fibers are polyester.

17. In a tubular support sleeve for use in lead-acid storage batteries, the improvement which comprises: a composite support and retaining tube braided from a mixture of fusible flat reinforced thermoplastic tapes and fibrous material, in which the fibrous material operates as a retainer mat and the tapes operate as stiffeners, and in which a predetermined and controlled porosity is obtained by varying the width of the tapes and the center-to-center distance between them.

18. The sleeve of claim 17 in which the tapes are fused to one another at their points of intersection to define a seamless tubular helical lattice structure.

19. The sleeve of claim 17 wherein the tapes are a laminated material, having a central core of polyester and outer layers of polyolefin.

20. The sleeve of claim 17 wherein the tapes are polyolefin having glass fiber reinforcement, the glass fibers being oriented along the length of the tapes.

21. The sleeve of any one of claims 17 through 20 wherein the retaining fibers are at least partially fusion embedded in the surface of the tapes.

22. The sleeve of any one of claims 1 through 14 or 17 through 20 wherein additional fusible flat reinforced thermoplastic tapes, oriented longitudinally to the sleeve, are included in the braid for some continuous portion of the circumference of the sleeve and which mask and substantially seal off this portion of the surface area of the sleeve.

23. The sleeve of any one of claims 1 through 14 or 17 through 20 wherein the fusible flat reinforced thermoplastic tapes comprising the seamless helical tubular lattice structure cross one another at 90° angles.

24. In a multi-tube sleeve for use in lead-acid storage battery plates, the improvement which comprises: a first array of fusible flat reinforced thermoplastic tapes oriented parallel to the central axes of the tubes of the sleeve, and a second array of tapes oriented at right angles to the first, the first and second arrays being woven together on a "cartridge belt" loom to form a series of interconnected individual support tubes, the tapes being fused to one another at their points of intersection to define opposing interwoven lattice structures presenting quadrilateral openings between the tapes, the porosity of the lattice structures and thus of the support tubes being predetermined and controlled by the width of the tapes and the center-to-center distance between them.

25. The sleeve of claim 24 wherein the tapes comprise a laminated material having a central core of polyester and outer layers of polyolefin.

26. The sleeve of claim 25 wherein the molecules of the polyester are oriented along the length of the tapes.

27. The sleeve of claim 24 wherein the tapes are polyolefin having glass fiber reinforcement, the glass fibers being oriented along the length of the tapes.

28. A sleeve according to any one of claims 24 through 27, having a separate retaining tube comprising braided glass fibers located within each individual support tube.

29. A sleeve according to any one of claims 24 through 27, having a separate retaining tube of nonwoven material located within each individual support tube.

30. In a multi-tube sleeve for use in lead-acid storage battery plates, the improvement which comprises: a first array of strands oriented parallel to the central axes of the tubes of the sleeve and a second array of strands oriented at right angles to the first, both the first and the second arrays comprising a mixture of flat fusible reinforced thermoplastic tapes and staple fibers, the first and second arrays being woven together on a "cartridge belt" loom to form a series of interconnected composite support and retaining tubes, the tapes being fused to one another at their points of intersection to provide opposing interwoven lattice structures presenting quadrilateral openings between the tapes, the dimensions of said openings being predetermined and controlled by the width of the tapes and the center-to-center distance between them.

31. The sleeve of claim 30 in which the tapes comprise a laminated material having a central core of polyester and outer layers of polyolefin.

32. The sleeve of claim 30 in which the tapes are polyolefin having glass fiber reinforcement, the glass fibers being oriented along the length of the tapes.

33. A sleeve according to any one of claims 30 through 32, in which the staple fibers are at least partially fusion embedded in the surface of the tapes at the points of intersection between the fibers and the tapes.

34. The sleeve according to any one of claims 1 through 15 or 19 through 20 in which additional fusible flat reinforced thermoplastic taps oriented longitudinally to the tube, are included in the braid of the support tube and thus in the seamless helical tubular lattice structure, and in which some of the openings in the support tube are triangular or polygonal in shape.

* * * * *